(12) United States Patent
Nieh et al.

(10) Patent No.: US 10,852,854 B2
(45) Date of Patent: Dec. 1, 2020

(54) CONTROL SYSTEM AND DEVICE FOR USE IN CONTROLLING OPERATION OF AN ELECTRICAL APPLIANCE

(71) Applicants: Defond Electech Co., Ltd, Guangdong (CN); Defond Components Limited, Hong Kong (CN)

(72) Inventors: Cheng Chen Nieh, Hong Kong (CN); Kai Kei Poon, Hong Kong (CN); Ka Leung Luk, Hong Kong (CN)

(73) Assignees: Defond Electech Co., Ltd, Guangdong (CN); Defond Components Limited, Hong Kong (CN)

( * ) Notice: Subject to any disclaimer, the term of this patent is extended or adjusted under 35 U.S.C. 154(b) by 0 days.

(21) Appl. No.: 16/366,871

(22) Filed: Mar. 27, 2019

(65) Prior Publication Data
US 2019/0302904 A1 Oct. 3, 2019

(51) Int. Cl.
| | |
|---|---|
| *G06F 3/0362* | (2013.01) |
| *G06F 3/044* | (2006.01) |
| *H01H 19/14* | (2006.01) |
| *G06F 3/0338* | (2013.01) |
| *G06F 3/0482* | (2013.01) |

(52) U.S. Cl.
CPC .......... *G06F 3/0362* (2013.01); *G06F 3/0338* (2013.01); *G06F 3/044* (2013.01); *H01H 19/14* (2013.01); *G06F 3/0482* (2013.01)

(58) Field of Classification Search
CPC ...... G06F 3/0338; G06F 3/0362; G06F 3/044; G06F 3/0482; H01H 19/14
See application file for complete search history.

(56) References Cited

U.S. PATENT DOCUMENTS

| | | | |
|---|---|---|---|
| 7,038,667 B1 | 5/2006 | Vassallo et al. | |
| 2006/0082545 A1 | 4/2006 | Choquet et al. | |
| 2010/0084249 A1 | 4/2010 | Bandy et al. | |
| 2010/0108476 A1* | 5/2010 | Trudeau | G01D 5/145 200/14 |
| 2014/0042004 A1* | 2/2014 | Tseng | G06F 3/0488 200/336 |

(Continued)

FOREIGN PATENT DOCUMENTS

| | | |
|---|---|---|
| CN | 104508619 A | 4/2015 |
| CN | 107788861 A | 3/2018 |

(Continued)

OTHER PUBLICATIONS

Patentability Search Report, dated Mar. 30, 2018, for Hong Kong Application No. 18104243.7, 8 pages.

(Continued)

*Primary Examiner* — Nelson M Rosario
(74) *Attorney, Agent, or Firm* — Seed IP Law Group LLP

(57) ABSTRACT

A control system for use in controlling operation of an electrical appliance, the system including: a processor module disposed inside of a housing of the electrical appliance, the processor module including at least one contactless-type sensor operably-connected with the processor module; an input control module including: an attachment element configured for releasably attaching the input control module to an outer surface of the housing; and at least one sensor-readable element configured for contactless-interaction with the contactless-type sensor.

15 Claims, 7 Drawing Sheets

(56) References Cited

U.S. PATENT DOCUMENTS

2018/0084937 A1\* 3/2018 Joo ........................ F24C 7/086

FOREIGN PATENT DOCUMENTS

| EP | 3290809 A1 | 3/2018 |
|----|------------|--------|
| JP | 3083070 U | 1/2002 |
| JP | 2005123021 A | 5/2005 |
| JP | 2013511089 A | 3/2013 |

OTHER PUBLICATIONS

European Search Report dated Jun. 19, 2019 for European Application No. 19 152 230.9, 4 pages.

\* cited by examiner

| ANGLE MOVEMENT | SENSOR A | SENSOR B | SENSOR C | REPRESENTATION |
|---|---|---|---|---|
| 0 | 0 | 0 | 1 | 1 |
| 22.5° | 0 | 1 | 1 | 3 |
| 45° | 1 | 1 | 0 | 5 |
| 67.5° | 1 | 0 | 0 | 4 |
| 90° | 0 | 0 | 1 | 1 |
| 112.5° | 0 | 1 | 1 | 3 |
| 135° | 1 | 1 | 0 | 5 |
| 157.5° | 1 | 0 | 0 | 4 |
| 180° | 0 | 0 | 1 | 1 |
| 202.5° | 0 | 1 | 1 | 3 |
| 225° | 1 | 1 | 0 | 5 |
| 247.5° | 1 | 0 | 0 | 4 |
| 270° | 0 | 0 | 1 | 1 |
| 292.5° | 0 | 1 | 1 | 3 |
| 315° | 1 | 1 | 0 | 5 |
| 337.5° | 1 | 0 | 0 | 4 |
|  |  |  |  |  |
| SPECIAL CASE | 0 | 0 | 0 | CONTROL KNOB DETACHED |

CONTROL SYSTEM AND DEVICE FOR USE IN CONTROLLING OPERATION OF AN ELECTRICAL APPLIANCE

TECHNICAL FIELD

The present invention relates to control systems and devices for use in controlling operation of an electrical appliance.

BACKGROUND OF THE INVENTION

Electrical appliances such as food processors, washing machines, microwave ovens and the like typically include a control panel having a control knob mounted thereon that are operable to control functioning of the appliance. The control knob may contain electronic components which may also be physically and electrically connected with other electronic control circuitry inside of a housing of the electrical appliance. As such control knobs are susceptible to ingress of dust, liquids and other particulates this damages the electronic components and results in inaccurate or erratic control operation.

SUMMARY OF THE INVENTION

The present invention seeks to alleviate at least one of the above-described problems.

The present invention may involve several broad forms. Embodiments of the present invention may include one or any combination of the different broad forms herein described.

In one broad form, the present invention provides a control system for use in controlling operation of an electrical appliance, the system including: a processor module disposed inside of a housing of the electrical appliance, said processor module including at least one contactless-type sensor operably-connected with the processor module; an input control module including: an attachment element configured for releasably attaching the input control module to an outer surface of the housing; and at least one sensor-readable element configured for contactless-interaction with the contactless-type sensor; wherein said at least one sensor-readable element of the input control module is configured for movement into a plurality of different positions relative to the at least one contactless-type sensor of the processor module disposed inside the housing, whereby responsive to said movement of the at least one sensor-readable element into the plurality of different positions relative to the at least one contactless-type sensor, the contactless-type sensor is configured to sense a plurality of different readings from the sensor-readable element, and, said processor module is configured for controlling the electrical appliance to operate in a plurality of different operational modes by reference to the plurality of different readings sensed by the contactless-type sensor.

Preferably, the at least one sensor-readable element may be configured for at least one of rotational, sliding, swiveling and depressible movement.

Preferably, the input control module may include a control knob.

Preferably, the input control module may include a first member and second member rotatably-connected together.

Preferably, the first member may include a relatively outer member and the second member includes a relatively inner member of the input control module.

Preferably, the second member may be depressible relative to the first member.

Preferably, the input control module may include a plurality of first members that are rotatable about the second member.

Preferably, the at least one sensor-readable element may be disposed on at least one of the first and second members whereby the at least one contactless-type sensor is configured for sensing a plurality of readings in response to at least one of rotational movement of the first member relative to the second member and depressible movement of the second member relative to the first member.

Preferably, the at least one sensor-readable element may be arranged in a ring-shaped configuration.

Preferably, the processor module may include a printed circuit board having at least one microprocessor integrated circuit chip operably-connected with the at least one contactless-type sensor.

Preferably, the at least one contactless-type sensor operably-connected to the processor module may include at least one of a magnetic-type sensor and an optical-type sensor.

Preferably, the at least one magnetic-type sensor may include a Hall-effect type sensor.

Preferably, the attachment element may be configured for releasably attaching the input control module to the outer surface of the housing by way of magnetic force.

Preferably, the input control module may be configured for releasable attachment to an outer surface of the housing comprising an electronic display panel.

Preferably, the electronic display panel may include a touch-sensitive electronic display panel.

In another broad form, the present invention provides a control knob for use in controlling operation of an electrical appliance, said electrical appliance including a housing and a processor module having at least one contactless-type sensor operably-connected thereto disposed inside the housing, the control knob including: an attachment element configured for releasably attaching the control knob to an outer surface of the housing; and at least one sensor-readable element configured for contactless-interaction with the contactless-type sensor; wherein said at least one sensor-readable element of the control knob is configured for movement into a plurality of different positions relative to the at least one contactless-type sensor of the processor module disposed inside the housing, whereby responsive to said movement of the at least one sensor-readable element into the plurality of different positions relative to the at least one contactless-type sensor, the contactless-type sensor is configured to sense a plurality of different readings from the sensor-readable element, and, said processor module is configured for controlling the electrical appliance to operate in a plurality of different operational modes by reference to the plurality of different readings sensed by the contactless-type sensor.

Preferably, the at least one sensor-readable element may be configured for at least one of rotational, sliding, swiveling and depressible movement.

Preferably, the control knob may include a first member and a second member rotatably-connected together.

Preferably, the first member may include a relatively outer member and the second member includes a relatively inner member of the control knob.

Preferably, the second member may be depressible relative to the first member.

Preferably, the control knob may include a plurality of first members that are rotatable about the second member.

Preferably, the at least one sensor-readable element may be disposed on at least one of the first and second members whereby the at least one contactless-type sensor is configured for sensing a plurality of readings in response to at least one of rotational movement of the first member relative to the second member and depressible movement of the second member relative to the first member.

Preferably, the at least one sensor-readable element may be arranged in a ring-shaped configuration.

Preferably, the processor module may include a printed circuit board having at least one microprocessor integrated circuit chip operably-connected with the at least one contactless-type sensor.

Preferably, the at least one contactless-type sensor may include at least one of a magnetic-type sensor and an optical-type sensor.

Preferably, the magnetic-type sensor may include a Hall-effect type sensor.

Preferably, the attachment element may be configured for releasably attaching the control knob to the outer surface of the housing by way of magnetic force.

Preferably, the control knob may be configured for releasable attachment to an outer surface of the housing comprising an electronic display panel.

Preferably, the electronic display panel may include a touch-sensitive electronic display panel.

In a further broad form, the present invention provides an electrical appliance operably-controllable by an input control module: said electrical appliance including a housing and a processor module having at least one contactless-type sensor operably-connected thereto disposed inside the housing; said input control module including: an attachment element configured for releasably attaching the input control module to an outer surface of the housing; and at least one sensor-readable element configured for interaction with the contactless-type sensor; wherein said at least one sensor-readable element of the input control module is configured for movement into a plurality of different positions relative to the at least one contactless-type sensor of the processor module disposed inside the housing, whereby responsive to said movement of the at least one sensor-readable element into the plurality of different positions relative to the at least one contactless-type sensor, the contactless-type sensor is configured to sense a plurality of different readings, and, said processor module is configured for controlling the electrical appliance to operate in a plurality of different operational modes by reference to the plurality of different readings sensed by the contactless-type sensor.

Preferably, the at least one sensor-readable element may be configured for at least one of rotational, sliding, swiveling and depressible movement.

Preferably, the input control module may include a control knob.

Preferably, the input control module may include a first member and second member rotatably-connected together.

Preferably, the first member may include a relatively outer member and the second member includes a relatively inner member of the input control module.

Preferably, the second member may be depressible relative to the first member.

Preferably, the input control module may include a plurality of first members that are rotatable about the second member.

Preferably, the at least one sensor-readable element may be disposed on at least one of the first and second members whereby the at least one contactless-type sensor may be configured for sensing a plurality of readings in response to at least one of rotational movement of the first member relative to the second member and depressible movement of the second member relative to the first member.

Preferably, the at least one sensor-readable element may be arranged in a ring-shaped configuration.

Preferably, the processor module may include a printed circuit board having at least one microprocessor integrated circuit chip operably-connected with the at least one contactless-type sensor.

Preferably, the at least one contactless-type sensor operably-connected to the processor module may include at least one of a magnetic-type sensor and an optical-type sensor.

Preferably, the magnetic-type sensor may include a Hall-effect type sensor.

Preferably, the attachment element may be configured for releasably attaching the input control module to the outer surface of the housing by way of magnetic force.

Preferably, the input control module may be configured for releasable attachment to an outer surface of the housing comprising an electronic display panel.

Preferably, the electronic display panel may include a touch-sensitive electronic display panel.

It would be understood from the preceding that the various broad forms of the present invention may assist in providing at least one advantage over the existing art. For instance, by forming the control knob or other such input control modules as passive element with the electronic components of the system being disposed within the electrical appliance housing, this protects against ingress of dust, liquids and other particulates into contact with electronic components of the electrical appliance which may compromise operation of such components. Further, this may reduce the user's exposure to the electronic components of the electrical appliance. Further, the releasable detachability of a control knob or other such input control modules from the housing of the electrical appliance may provide greater ease and speed of cleaning and replacement of the control knob when damaged. Further, the releasable detachability of a control knob or other such input control modules from the housing of the electrical appliance may allow the control panel surface of the electrical appliance to be easily cleaned without obstruction by the control knob. Further, as the control knob or other such input control module may be detachable from the control panel of the housing of the electrical appliance, this allows for greater ease and speed of production assembly during manufacturing of such electrical appliances compared to the existing art where control knobs are required to be fixedly mounted to the control panel surface of the electrical appliance housing.

Further, as the control knob or other such input control module may be releasably attachable to the control panel of the housing of the electrical appliance, this allows for additional room on the control panel to be utilised for cosmetic design.

BRIEF DESCRIPTION OF THE DRAWINGS

The present invention will become more fully understood from the following detailed description of a preferred but non-limiting embodiment thereof, described in connection with the accompanying drawings, wherein.

DETAILED DESCRIPTION OF THE PREFERRED EMBODIMENTS

Preferred embodiments of the present invention will now be described herein with reference to FIGS. 1A to 7. The embodiments comprise aspects of a system and device for use in controlling operation of an electrical appliance such as a food processor, washing machine, microwave oven or the like. It would be appreciated and understood that alternate embodiments of the present invention may be used with other types of electrical appliances, machines and devices. Further, in the embodiment described herein, a magnetic-type sensor is utilised although it would be appreciated that in alternate embodiments, any other suitable contactless-type sensor such as an optical-type sensor may instead be utilised in an analogous manner.

Figure 5:
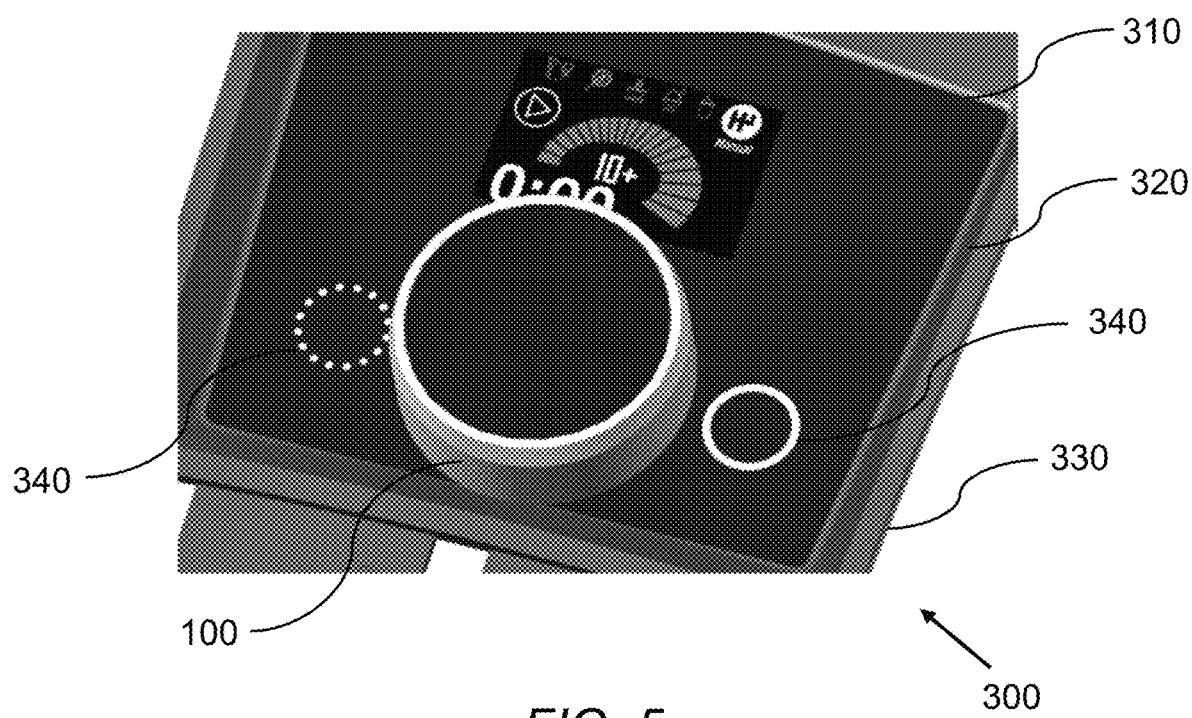
FIG. 5 shows an example representation of the control knob releasably attached to an electronic display panel on a surface of the housing of the electrical appliance, in accordance with an embodiment of the present invention.

In this embodiment, the control system includes an input processor module (200) located inside of a housing of the electrical appliance and an input control module (100) that is releasably attachable to a control panel surface of the housing of the electrical appliance. FIG. 5 shows an example embodiment of the input control module (100) releasably attached to the control panel surface of the electrical appliance. The input processor module (200) and the input control module (100) are configured for contactless interaction with each other through the housing which physically and electrically separates the input processor module (200) from the input control module (100).

In this embodiment, the input control module (100) includes a control knob (100) comprising a circular-shaped outer member (110) surrounding and movably-connected with a circular-shaped inner member (120). An attachment element (130) is configured for releasably attaching the control knob (100) to the control panel surface of the housing. The attachment element (130) comprises a single-pole ring-shaped permanent magnet (130) disposed within a base portion (120A) of the inner member (120) which is configured for magnetic attraction to a circular-shaped metal fitting plate (350) disposed inside of the housing between a mounting plate (340) and faceplate of the control panel surface as shown in the exploded view of FIG. 6. The metal fitting plate (350) assists in magnetically locating the base portion (120A) of the inner member (120) in its laterally stationary position upon the control panel surface. The magnetic field strength of the permanent magnet (130) should be selected of suitable magnitude to effect magnetic coupling with the metal fitting plate (350) through the control panel surface of the housing whereby the control knob (100) is laterally secured upon the control panel surface during ordinary operation, yet is able to be detached from the control panel surface by force of a user's hand with relative ease in order to clean the control knob (100) or the control panel surface. In alternate embodiments of the present invention, other types of attachment elements may be utilised to releasably attach the control knob (100) to the control panel surface. For instance, the input control module (100) may be configured for releasable attachment by way of any suitable mechanical type securement mechanism, friction-fitting securement mechanism, or adhesive type securement, with the control panel surface.

Figure 1A:
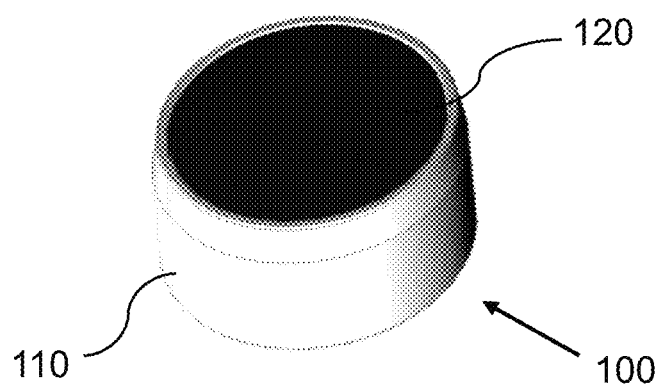
FIG. 1A-1C shows an example control knob for use in controlling an electrical appliance in accordance with an embodiment of the present invention.
Figure 1B:
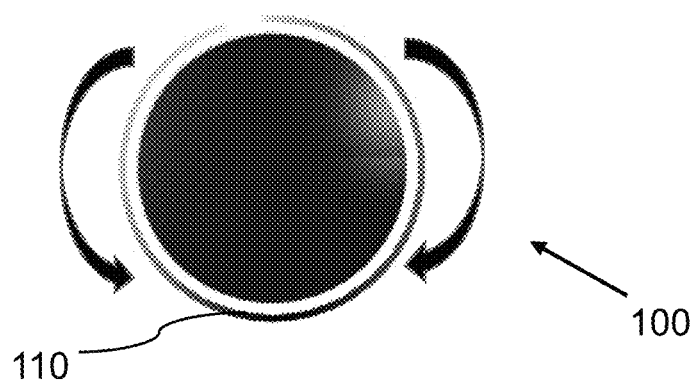
Figure 1C:
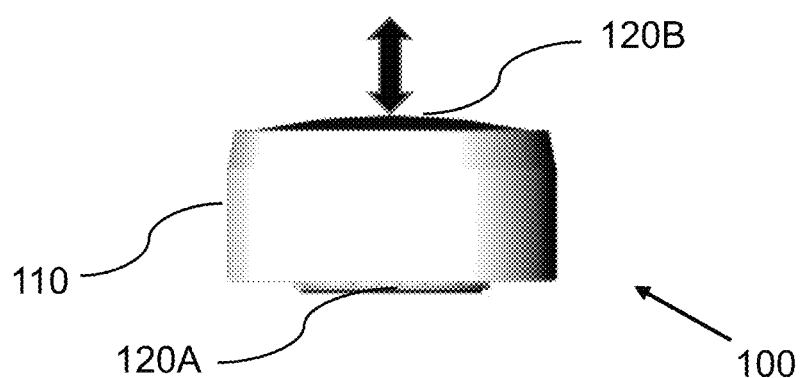
Figure 2A:
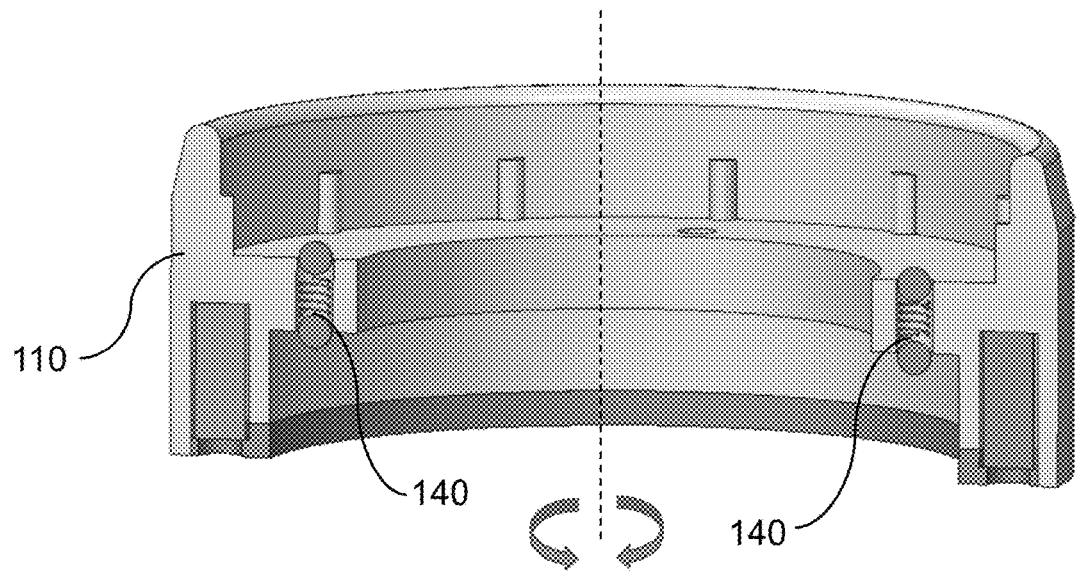
FIG. 2A shows a cut-away view of a portion of the outer member of the control knob in accordance with an embodiment of the present invention.
Figure 2B:
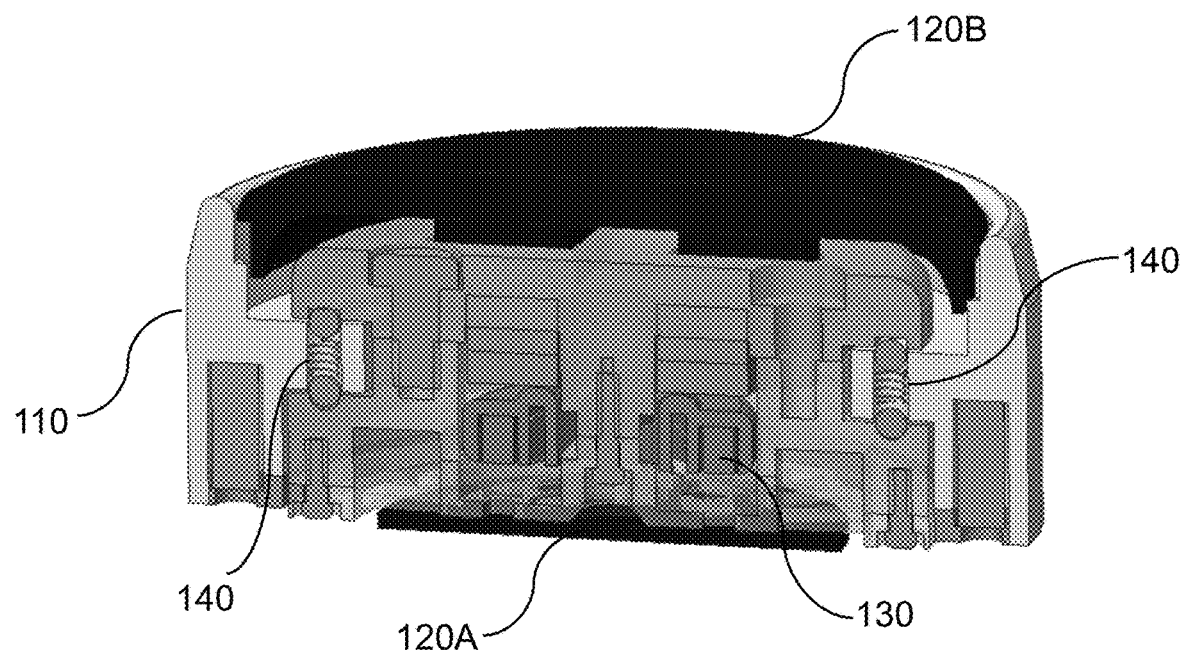
FIG. 2B shows a cut-away view of a control knob showing a portion of the outer member and inner member, in accordance with an embodiment of the present invention.

When the base portion (120A) of the inner member (120) is magnetically secured to the control panel surface of the housing the stationary inner member (120) does not rotate in its fixed position however the outer member (110) is able to rotate coaxially about the stationary inner member (120) as shown in FIG. 1B. In certain embodiments, the control knob (100) may include a detent mechanism disposed between the outer and inner members to provide controlled incremental rotatable movement of the outer member (110) about the inner member (120). As shown in FIG. 10, a top portion (120B) of the inner member (120) is also configured for depressible movement relative to the base portion (120A) of the inner member (120) from a default undepressed position towards a depressed position, and whereby a return spring is configured for urging the top portion (120B) again towards the undepressed position. In alternate embodiments of the present invention, the input control module (100) may be implemented in different shapes and configurations and may comprise of one or a plurality of component parts that may be configured for rotational, swiveling, slidable and depressible movement.

Figures 4A, 4B:
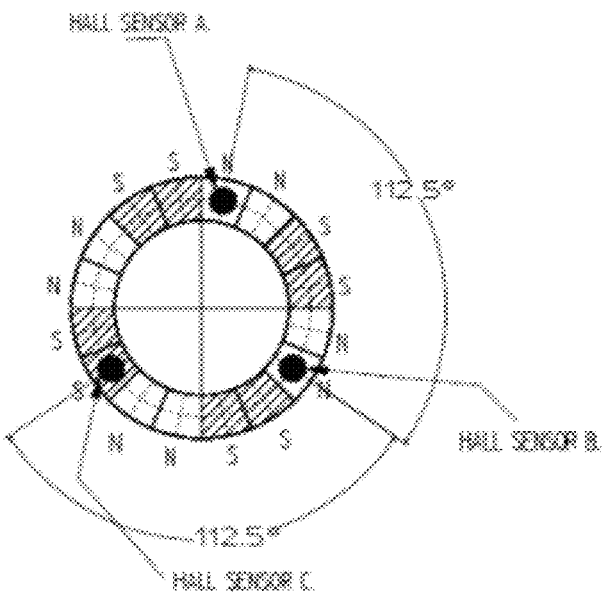
FIG. 4A depicts an example chart of sensed magnetic field readings of 3 Hall-effect type sensors of an input processor control module indicative of varying rotational positions of the control knob, in accordance with an embodiment of the present invention.
FIG. 4B depicts an example circular arrangement of the magnetic poles of a plurality of magnetic elements within the control knob, and overlayed on top of the circular arrangement of magnetic poles, a representation of the relative positions of 3 Hall-effect type sensors disposed on the input processor module at one instant during rotation of the control knob, in accordance with an embodiment of the present invention.

The control knob (100) also includes a plurality of permanent magnetic elements (140) having magnetic poles arranged within the outer and inner members (110,120) such that at least 16 different rotational positions (at 22.5° rotational increments) of the outer member (110) about the inner member (120) may be determinable based upon the different magnetic field readings sensed by magnetic Hall-effect type sensors (220) in the various rotational positions. The magnetic field readings are sensed by Hall-effect type sensors (220) the outputs of which are interfaced with input pins of a microprocessor integrated circuit chip via suitable interfacing circuitry on a printed circuit board (210) of the input processor module (200). Responsive to the magnetic field readings being received by the microprocessor chip from the Hall-effect type sensors (220), a main printed circuit board module (500) that is operably-connected to the input processor module (200) is programmed to output electrical control signals to various components of the electrical appliance in order for the electrical appliance to function in predetermined operational modes corresponding to each of the 16 different corresponding rotational positions. For instance, such electrical control signals from the main printed circuit board module (500) may control operation of an electric motor in a variety of speeds and directions, or, may control operation of a lighting unit in a variety of output lighting modes with varying colour, brightness characteristics. FIG. 4B depicts an example circular arrangement of the magnetic poles of the plurality of magnetic elements (140) within the control knob (100), and overlayed on top of the circular arrangement of magnetic poles, a representation of the relative positions of 3 Hall-effect type sensors (220) disposed on the input processor module (200) at one instant during rotation of the control knob (100). As the outer member (110) is rotated about the inner member (120) on the control panel surface, the 3 stationary Hall-effect type sensors (220) of the input processor module (200) inside of the electrical appliance housing will each sense either a magnetic North pole or magnetic South pole reading proximate to it which the input processor module (200) will represent as either a 1 or a 0 respectively, when the control knob is arranged in each of the 16 rotational positions. FIG. 4A depicts a chart of the sensed readings of each of the 3 Hall-effect type sensors (220) when the control knob is arranged in each of the 16 rotational positions. The summation of the sensed readings (i.e. the summation of the 1s and 0s sensed by the 3 sensors (A,B,C) is shown in the column "REPRESENTATION". It can be seen that in this embodiment, the summation of the sensor values cycles through the values "1", "3", "5" and "4" every 90° rotation of the outer member (110) at 22.5° angular increments about the inner member (120) and such values may readily serve as a reference for the corresponding rotational positions of the control knob.

Figure 3A:
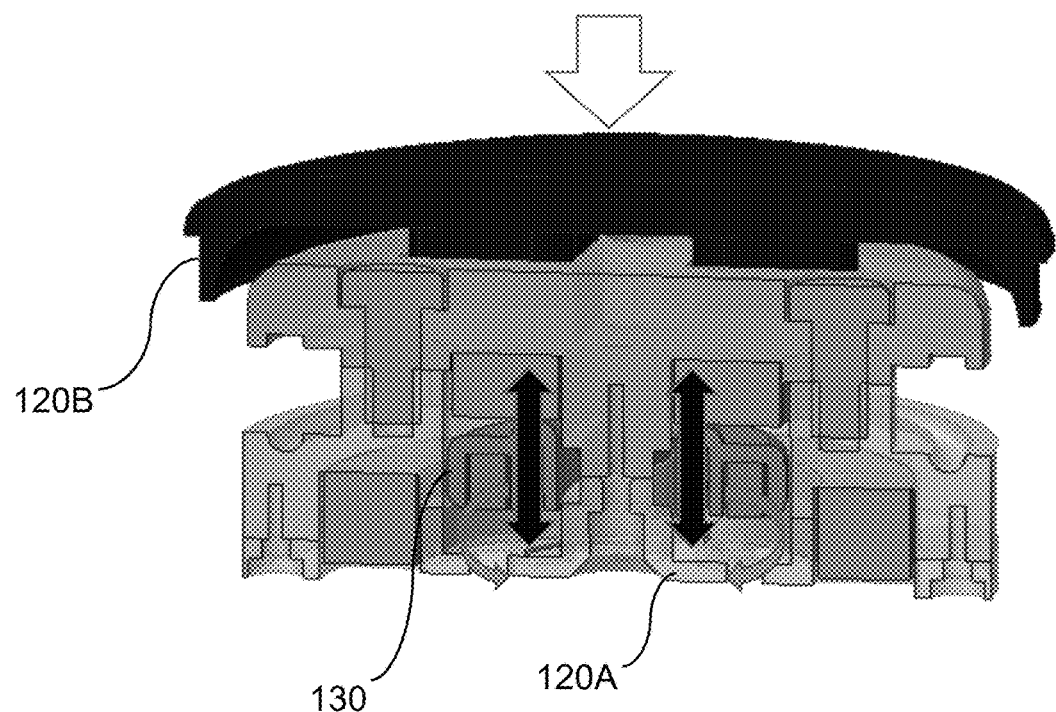
FIG. 3A shows a cut-away view of a control knob showing a top portion of the outer member in an undepressed position relative to a base portion of the outer member, in accordance with an embodiment of the present invention.
Figure 3B:
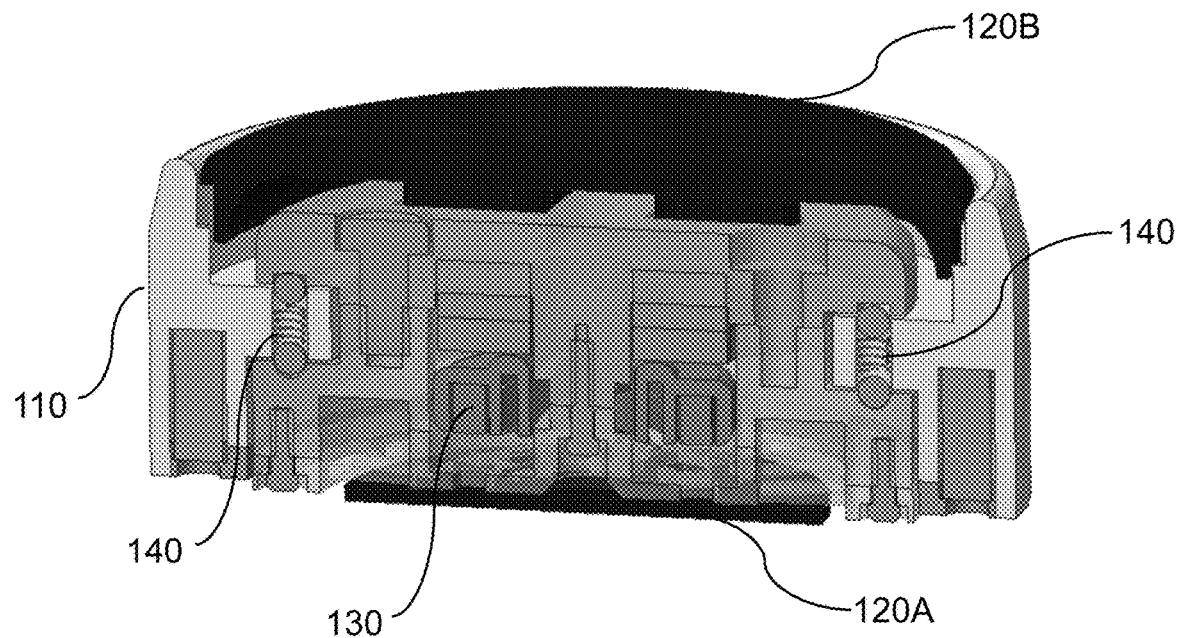
FIG. 3B shows a cut-away view of a control knob showing a top portion of the outer member in an depressed position relative to a base portion of the outer member, in accordance with an embodiment of the present invention.

One or more of the plurality of Hall-effect type sensors (220) may also be configured to sense varying magnetic field readings indicative of when the top portion (120B) of the inner member (120) has been depressed relative to the base portion (120A). FIG. 3A shows a top portion (120B) of the inner member (120) control knob (100) arranged in a relatively undepressed position relative to a base portion (120A) of the inner member (120) whilst FIG. 3B shows the top portion (120B) of the inner member (120) control knob (100) arranged in a relatively depressed position relative to a base portion (120A) of the inner member (120). A further Hall-effect type sensor may be operably-connected with the input processor module (200) and configured so as to sense when a magnetic field reading from the control knob (100) in indicative of the top portion (120B) of the inner member (120) being arranged in a depressed or undepressed position relative to the base portion (120A). Further, the input processor module (200) may be configured such that responsive to all 3 Hall-effect type sensors (A,B,C), failing to sense a threshold magnetic field reading, the input processor module (200) recognises that the control knob is (100) detached from the control panel surface.

It is envisaged that in certain embodiments, multiple outer members may be connected to and rotatable coaxially about the inner member (120). In such embodiments, the multiple outer members may be arranged so as to be stacked one on top of each other, or, one outer member may be nested within the other outer member. In such embodiments, the plurality of outer members may rotate concentrically about the inner member or may be configured to rotate eccentrically about the inner member.

Figure 6:
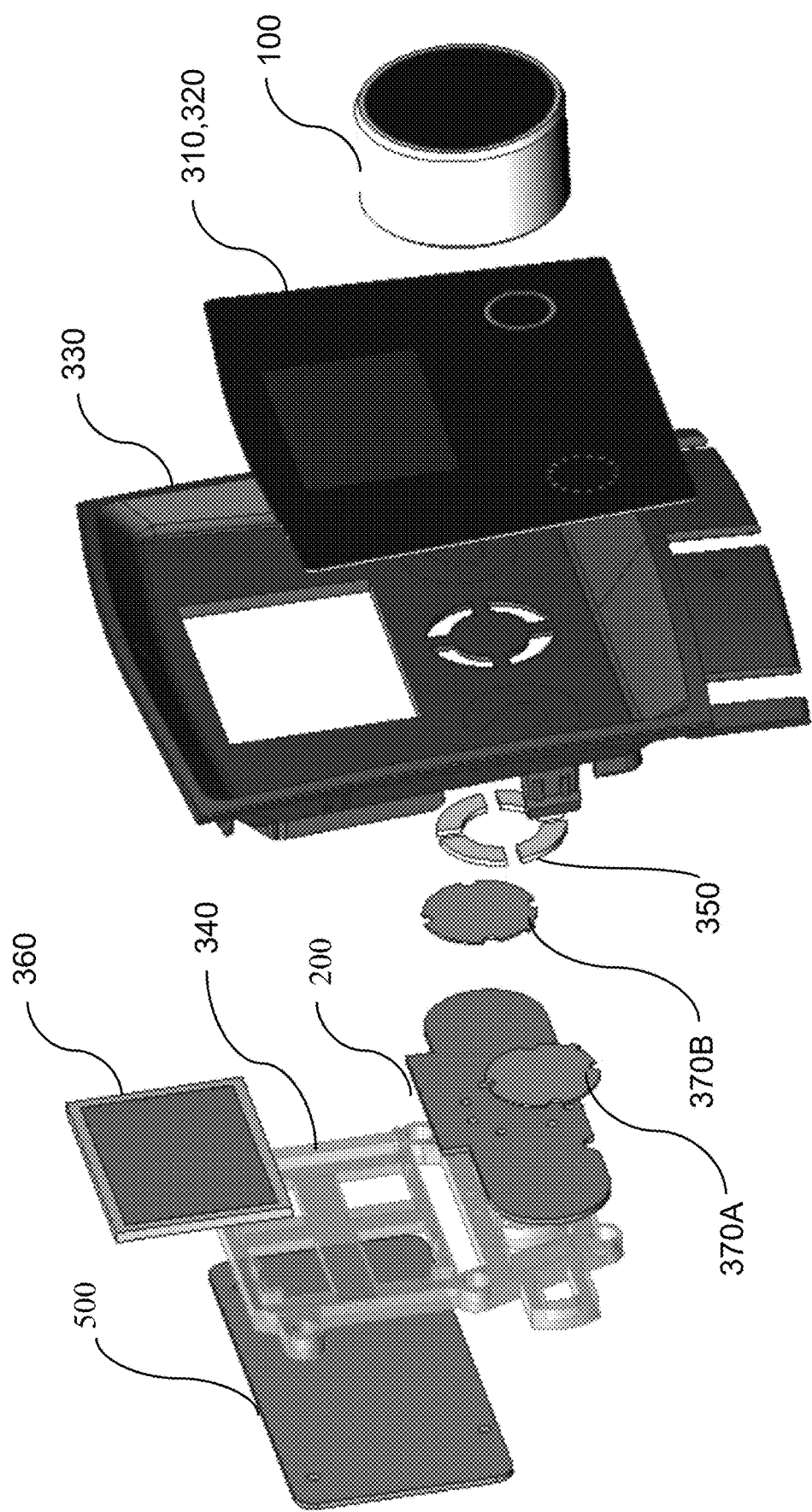
FIG. 6 shows an exploded view of a control system for use in controlling an electrical appliance in accordance with an embodiment of the present invention.
Figure 7:
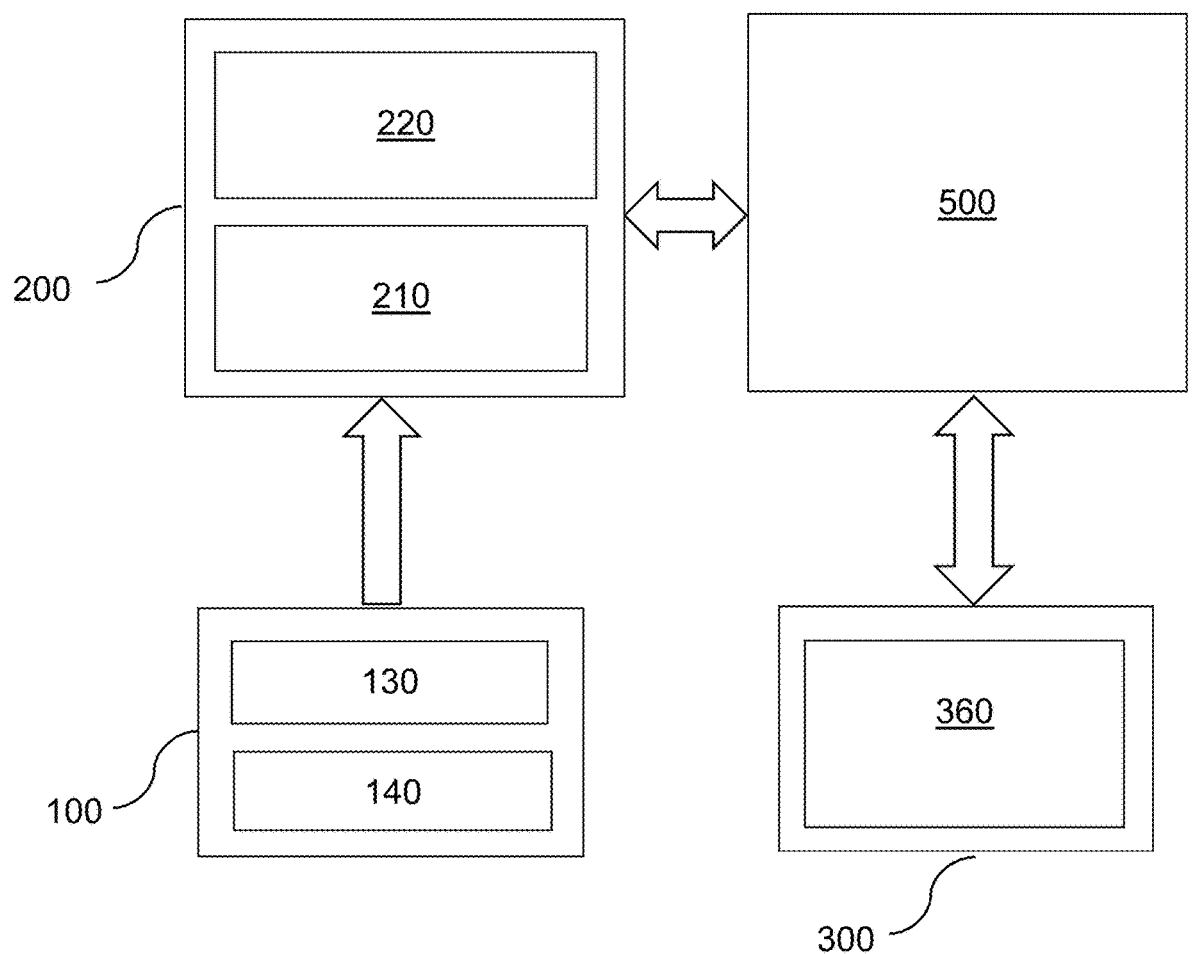
FIG. 7 shows a functional block diagram of an embodiment of the control system for use with an electrical appliance.

The control panel surface of the electrical appliance housing includes a touch-sensitive display panel (300) as shown in FIGS. 5 and 6 that is operably-connected with the main printed circuit board module (500). The touch-sensitive display (300) comprises a transparent PMMA plastic cover lens layer (310) overlayed on top of a transparent capacitive touch sensor layer (320). The PMMA layer (310) includes indicia printed upon it representing regions of the touch-sensitive display (300) that are configured to serve as touch-sensitive control keys (340) whereby in response to touch interaction with the touch-sensitive control keys (340), the main printed circuit board module (500) is programmed to output electrical control signals to various components of the electrical appliance in order for the electrical appliance to function in predetermined operational modes corresponding to the touch interaction. A pair of light guide elements (370A,370B) are located beneath the control keys to assist in controlling light transmission therethrough for improved visibility and/or aesthetic purposes. A 2.4 inch thin-film-transistor liquid crystal colour display (360) is seated within the faceplate (330) and positioned beneath the touch-sensor layer (320) so as to be visible through the transparent touch-sensor layer (320) and the transparent PMMA layer (310). Power is delivered to the thin-film-transistor colour display (360) from a power supply of the electrical appliance which also powers the input processor module (200) and the main printed circuit board module (500). A mounting plate (340) secures the entire touch sensitive display (300) assembly as shown in FIG. 6 in a fixed position within the housing so that the control panel is proximate an outer surface of the housing and visible to the user.

In the various embodiments described herein, the control knob (100) may further be operably-connected with the display panel (300) via the input processor module (200) so as to allow a user to controllably navigate through a plurality of different interactive operational mode menus or listings that are displayed upon the touch-sensitive display panel (300) by the input processor module (200). Accordingly, a user may navigate through multi-level menus and listings of operational mode options by rotation of the outer member (110) of the control knob (100) whilst the menu entries may be selected by depressing movement of the inner member (120) of the control knob (100). Such movement of the control knob (100) is sensed by the input processor module (200) and responsive to this movement, the main processor module (500) is programmed to output electrical control signals to various components of the electrical appliance in order for the electrical appliance to function in accordance with predetermined operational modes corresponding to the movements of the control knob (100). Such menu listings may for instance allow selection of different washing modes of a washing machine, different drying modes of the washing machine, and may also allow the user to incrementally increase or decrease operational settings such as temperature, wash time, dry time etc of a washing machine.

Although embodiments of the present invention described herein utilise permanent magnets within the control knob (100), it is possible that one or more electro-magnet elements may instead be disposed within the control knob (100) which may be activated by a current provided by a battery module within the control knob (100).

Any one of the functional modules of the embodiments described herein may be implemented by way of software for execution by various types of processors. Executable code may, for instance, comprise one or more physical or logical blocks of computer instructions which may, for instance, be organised as an object, procedure, function, or algorithm. The identified blocks of computer instructions need not be physically located together, but may comprise disparate instructions stored in different locations which, when joined logically together, comprise the module and achieve the stated purpose for the module. Functional modules of the embodiments may also be implemented as hardware circuitry comprising custom circuits or gate arrays, off-the-shelf semiconductors such as logic chips, transistors, or other discrete components. Functional modules may also be implemented in programmable hardware devices such as field programmable gate arrays, programmable array logic, programmable logic devices or the like. Executable code may comprise a single instruction, multiple instructions, and may be distributed over several different code segments, among different programs, and across several discrete memory devices. Similarly, operational data may be identified and illustrated herein within devices, units, and the like and may be embodied in any suitable form and organised within any suitable type of data structure. The operational data may be collected as a single data set, or may be distributed over different locations including over different storage devices, and may exist, at least partially, merely as electronic signals on a system or network.

In alternate embodiments of the present invention, optical-type position sensors may be utilised in place of magnetic-type sensors in which characteristics of light transmitted from the sensor-readable element (e.g. wavelength, intensity, phase or polarization of the light) are able to be sensed by the optical-type sensor and used to determine a relative position of the sensor-readable element from the optical-type sensor and responsive to the sensed readings, the processor module is able to effect of output control signals for controlling operation of the electrical appliance in a plurality of different operational modes. Certain optical-type position sensors may operate on the principle of sensing characteristics of reflected light emitted from the sensor-readable element and the processor module varying operation modes of the electrical appliance by reference characteristics of the reflected light sensed by the optical-type sensor. In such alternate embodiments utilising an optical-type sensor, the housing wall surface which physically separates the contactless-type optical sensor from the sensor-readable element (e.g. a light emitting device) may include at least one optical pathway or light-guide configured for allowing transmission of light therethrough from the light-emitting device to the optical-type sensor.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. A control system for use in controlling operation of an electrical appliance, the system including:

a processor module disposed inside of a housing of the electrical appliance, the processor module including at least one contactless-type sensor operably-connected with the processor module;

an input control module, including:

an attachment element configured for releasably attaching the input control module to an outer surface of the housing; and at least one sensor-readable element configured for contactless-interaction with the contactless-type sensor;

the at least one sensor-readable element of the input control module being configured for movement into a plurality of different positions relative to the at least one contactless-type sensor of the processor module disposed inside the housing, whereby responsive to the movement of the at least one sensor-readable element into the plurality of different positions relative to the at least one contactless-type sensor, the contactless-type sensor is configured to sense a plurality of different readings from the sensor-readable element, and, the processor module is configured for controlling the electrical appliance to operate in a plurality of different operational modes by reference to the plurality of different readings sensed by the contactless-type sensor;

wherein the input control module further includes a first member and a second member that are rotatably connected together and wherein a detent mechanism is disposed between the first and second members to provide controlled incremental rotatable movement of the first member about the second member, and, the at least one contactless-type sensor being communicably-connected with the processor module so as to provide the processor module with readings indicative of the plurality of rotational positions of the first member relative to the second member.

2. The control system as claimed in claim 1 wherein the at least one sensor-readable element is configured for at least one of rotational, sliding, swiveling and depressible movement.

3. The control system as claimed in claim 1 wherein the input control module includes a control knob.

4. The control system as claimed in claim 1 wherein the second member is depressible relative to the first member.

5. The control system as claimed in claim 1 wherein the input control module includes a plurality of first members that are rotatable about the second member.

6. The control system as claimed in claim 1 wherein the at least one sensor-readable element is disposed on at least one of the first and second members whereby the at least one contactless-type sensor is configured for sensing a plurality of readings in response to at least one of rotational movement of the first member relative to the second member and depressible movement of the second member relative to the first member.

7. The control system as claimed in claim 1 wherein the at least one sensor-readable element is arranged in a ring-shaped configuration.

8. The control system as claimed in claim 1 wherein the processor module includes a printed circuit board having at least one microprocessor integrated circuit chip operably-connected with the at least one contactless-type sensor.

9. The control system as claimed in claim 1 wherein the at least one contactless-type sensor operably-connected to the processor module includes at least one of a magnetic-type sensor and an optical-type sensor.

10. The control system as claimed in claim 9 wherein the at least one magnetic-type sensor includes a Hall-effect type sensor.

11. The control system as claimed in claim 1 wherein the attachment element is configured for releasably attaching the input control module to the outer surface of the housing by way of magnetic force.

12. The control system as claimed in claim 1 wherein the input control module is configured for releasable attachment to an outer surface of the housing comprising an electronic display panel.

13. The control system as claimed in claim 12 wherein the electronic display panel includes a touch-sensitive electronic display panel.

14. A control knob for use in controlling operation of an electrical appliance, the electrical appliance including a housing and a processor module having at least one contactless-type sensor operably-connected thereto disposed inside the housing, the control knob including:
 an attachment element configured for releasably attaching the control knob to an outer surface of the housing; and
 at least one sensor-readable element configured for contactless-interaction with the contactless-type sensor;
  the at least one sensor-readable element of the control knob being configured for movement into a plurality of different positions relative to the at least one contactless-type sensor of the processor module disposed inside the housing, whereby responsive to the movement of the at least one sensor-readable element into the plurality of different positions relative to the at least one contactless-type sensor, the contactless-type sensor is configured to sense a plurality of different readings from the sensor-readable element, and, the processor module is configured for controlling the electrical appliance to operate in a plurality of different operational modes by reference to the plurality of different readings sensed by the contactless-type sensor;
 wherein the input control module further includes a first member and a second member that are rotatably connected together and wherein a detent mechanism is disposed between the first and second members to provide controlled incremental rotatable movement of the first member about the second member, and, the at least one contact-less type sensor being communicably-connected with the processor module so as to provide the processor module with readings indicative of the plurality of rotational positions of the first member relative to the second member.

15. An electrical appliance operably-controllable by an input control module:
 the electrical appliance including a housing and a processor module having at least one contactless-type sensor operably-connected thereto disposed inside the housing;
 the input control module, including:
  an attachment element configured for releasably attaching the input control module to an outer surface of the housing; and
  at least one sensor-readable element configured for interaction with the contactless-type sensor;
   the at least one sensor-readable element of the input control module being configured for movement into a plurality of different positions relative to the at least one contactless-type sensor of the processor module disposed inside the housing, whereby responsive to the movement of the at least one sensor-readable element into the plurality of different positions relative to the at least one contactless-type sensor, the contactless-type sensor is configured to sense a plurality of different readings, and, the processor module is configured for controlling the electrical appliance to operate in a plurality of different operational modes by reference to the plurality of different readings sensed by the contactless-type sensor;
  wherein the input control module further includes a first member and a second member that are rotatably connected together and wherein a detent mechanism is disposed between the first and second members to provide controlled incremental rotatable movement of the first member about the second member, and, the at least one contact-less type sensor being communicably-connected with the processor module so as to provide the processor module with readings indicative of the plurality of rotational positions of the first member relative to the second member.

* * * * *